3,591,572
POLYMERIZATION PROCESS USING N-HYDRO-CARBYL - N - METHYLENE SULFONATES AS DISPERSING AGENTS

Walter Stamm, Tarrytown, N.Y., and Eugene H. Uhing, Ridgewood, N.J., assignors to Stauffer Chemical Company, New York, N.Y.
No Drawing. Continuation-in-part of abandoned application Ser. No. 622,445, Mar. 13, 1967. This application June 19, 1968, Ser. No. 738,092
Int. Cl. C08f 1/13, 3/30, 15/02
U.S. Cl. 260—92.8                         6 Claims

ABSTRACT OF THE DISCLOSURE

The invention is a process for preparing polymers by dispersion polymerization techniques using an N-hydrocarbyl N-methylene sulfonate as a dispersing agent.

CROSS REFERENCE TO RELATED APPLICATION

This application is a continuation-in-part of Ser. No. 622,445, filed Mar. 13, 1967, now abandoned, titled N-Alkyl N-Methylene Sulfonates.

BACKGROUND OF THE INVENTION

Two conventionally employed dispersion polymerization techniques are often used commercially in the polymerization of ethylenically unsaturated monomers. These techniques are known as suspension polymerization and emulsion polymerization.

Suspension polymerization refers to the polymerization of a monomer dispersed in a suspension medium which is a non-solvent for both the monomer and the polymer, generally water, usually containing a suspending agent. Normally a monomer soluble initiator is used. Suspension polymerization is generally accomplished by dispersing the monomer in the suspending medium either by constant agitation, by the use of suspending agents, or preferably both. The suspending agents can be high molecular weight organic materials such as gelatin, hydroxyethyl cellulose, carboxymethyl cellulose or inorganic finely divided powders such as talc or clay. The high molecular weight organic materials can also provide a protective coating on the suspended droplets preventing them from coalescing.

The product polymer produced by suspension polymerization is in the form of polymeric beads from microscopic size (about $10\mu$) up to about one quarter inch in diameter.

Emulsion polymerization is the polymerization of a monomer in a medium which is a non-solvent for both the monomer and the polymer, usually water, using an initiator which is soluble in the dispersing medium and an emulsifying agent to maintain the monomer in the emulsified form. Emulsifying agents such as sodium lauryl sulfate, potassium stearate, alkyl benzene sulfonate and cetyl pyridinium chloride can be used in emulsion polymerization.

The polymer product of an emulsion polymerization has a particle size range of from about $0.03\mu$ to about $1.0\mu$ The small particle size of an emulsion polymer presents problems in washing, drying and handling of the material. Because of these difficulties, emulsion polymerization is used only where its unique polymer properties are necessary and can offset the difficulties caused by the small particle size.

The present invention provides a process for producing an emulsion polymerized polymer having a large particle size (above $1\mu$). The large particle size provides for easier handling and processing of the resin.

SUMMARY OF THE INVENTION

According to the present invention, a process is provided to prepare polymers comprising polymerizing by emulsion techniques in the presence of an initiator, an ethylenically unsaturated monomer composition, and, as an emulsifying agent, a compound selected from the group consisting of the following:

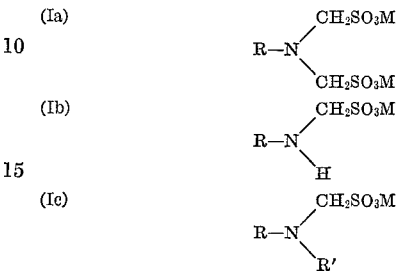

wherein M can be any monovalent positive ion, having a molecular weight from about 2 to about 40. Included within this definition is ammonium, and alkali metal ions such as lithium, sodium, potassium and the like. The preferred species being sodium, potassium and ammonium.

R and R' in the above formula can be hydrocarbyl radicals consisting essentially of hydrogen and carbon and containing from about 6 to about 36 carbon atoms inclusive and preferably from about 10 to about 30 carbon atoms.

DETAILED DESCRIPTION OF THE INVENTION

The term "hydrocarbyl group consisting essentially of" is intended to include groups consisting essentially of carbon and hydrogen. It is, of course, understood that such groups can contain other groups which are inert or non-reactive in the polymerization. Such groups can contain elements other than carbon and hydrogen such as nitrogen, oxygen, sulfur, chlorine or fluorine. Such groups must be present in such a manner that they do not substantially change the nature of the hydrocarbon group. For example, chlorine or fluorine can be present on the hydrocarbon group as substituents. Oxygen and sulfur may be present as ether or thioether groups.

Included within the term hydrocarbyl group are the aliphatic, cycloaliphatic, and aromatic hydrocarbon moieties. Illustrative of the aliphatic hydrocarbon moieties are the alkyl moieties, such as octyl, triisopropyl, decyl, undecyl, dodecyl, isodecyl, tetrapropyl, tridecyl, tetradecyl, pentadecyl, isopentadecyl, hexadecyl octadecyl, nonadecyl eicosyl, heneicosyl, docosyl, tricosyl, tetracosyl, pentacosyl, octacosyl, tricontyl, dotricontyl, hexatricontyl and the like, as well as the corresponding olefinic moieties containing as many as two positions of olefinic unsaturation as occurs in many of the fat alkyls. The aliphatic groups as illustrated above by R and R' can derive from the fatty alkyls and alkenyls as are derived from the natural fats and oils, including tall oils, or from lower polymeric olefins, such as tetra- or pentapropylene, having generally from 8 to about 36 carbon atoms inclusive. Illustrative of the cycloalkyl groups are cyclopropyl, cyclobutyl, cyclopentyl, cyclohexyl, and the like. Illustrative of the aromatic hydrocarbyl moieties are phenyl, benzyl, phenethyl, tolyl, naphthyl and the like.

The preferred compounds are the bis methylene sodium sulfonates having an aliphatic hydrocarbyl group of from about 12 to about 30 carbon atoms such as tetradecyl-amino bis methylene sodium sulfonate.

The amount of dispersing agent required in the practice of this invention is from about 0.2% to about 6.0% by weight of the monomer. The preferred range being from about 0.5% to about 2.0% by weight of the monomer.

The ethylenically unsaturated monomers and comers that are useful in the practice of the present invention include those ethylenically unsaturated materials which are capable of entering into an addition polymerization reaction through emulsion techniques as a homopolymer, copolymer, terpolymer or the like. Included within the definition of ethylenically unsaturated materials useful in the practice of the present invention are the vinyl halide monomers of the formula:

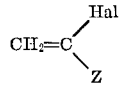

wherein Z can be selected from halogen hydrogen, or mixtures thereof, Hal is halogen, for example vinyl fluoride, vinyl chloride, vinyl bromide, vinyl iodide, vinylidene fluoride, vinylidene chloride; vinylidene bromide, vinylidene iodide and the like. The formula is intended to include all $\alpha$-halo-substituted ethylenically unsaturated materials which are included within the limits of the formula and which are capable of entering into an additional polymerization reaction. In addition to the vinyl halide monomers suitable, ethylenically unsaturated materials which can be utilized in the practice of the present invention to form homopolymers, copolymers, terpolymers or the like include the following: monoolefinic hydrocarbons, i.e., monomers containing only carbon and hydrogen, including such materials as ethylene, propylene, 3-methylbutene-1 4-methylpentene-1, pentene-1, 3,3-dimethylbutene-1, 4,4-dimethylbutene-1, octene-1, decene-1, styrene and its nuclear or alpha-alkyl or aryl substituted derivatives, e.g., o-, m- or p-methyl, ethyl, propyl or butyl styrene; alphamethyl, ethyl, propyl or butyl styrene; phenyl styrene, and halogenated styrenes such as alpha-chlorostyrene; monoolefinically unsaturated esters including vinyl esters, e.g., vinyl acetate vinyl propionate, vinyl butyrate, vinyl stearate, vinyl benzoate, vinyl-p-chlorobenzoates, alkyl methacrylates, e.g., methyl, ethyl, propyl and butyl methacrylate; octyl methacrylate, alkyl crotonates, e.g., octyl; alkyl acrylates, e.g., methyl, ethyl, propyl butyl, 2-ethyl hexyl, stearyl, hydroxyethyl and tertiary butylamino acrylates; isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alphachloroacetate, vinyl alpha-chloropropionate and vinyl alpha bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols e.g., beta-ethyl allyl alcohol and beta-propyl allyl alcohol; halo-alkyl acrylates, e.g., methyl alpha-chloroacrylate, ethyl alpha-chloroacrylate, methyl alpha-bromoacrylate, ethyl alpha-bromoacrylate, methyl alpha-fluoracrylate, ethyl alpha-fluoracrylate, methyl alpha-iodoacrylate and ethyl alpha-iodoacrylate; alkyl alpha-cyanoacrylates e.g. methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl furamate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, cinnamic acid, maleic, fumaric and itaconic acids, maleic anhydride and the like. Amides of these acids are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl $\beta$-chloroethyl sulfide, vinyl $\beta$-ethoxyethyl sulfide and the like can also be included. Diolefinically unsaturated hydrocarbons containing two olefinic groups in conjugated relation and the halogen derivatives thereof, e.g. butadiene-1,3; 2-methyl-butadiene-1,3; 2,3-dimethyl-butadiene-1,3; 2-chloro-butadiene-1,3; 2,3-dichloro-butadiene-1,3; and 2-bromo-butadiene-1,3; and the like.

Specific monomer compositions for forming copolymers can be illustrated by the following: vinyl chloride and vinyl acetate, vinylidene chloride and fumaric acid esters, methacrylate ester and styrene, vinyl chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from vinyl halide monomers and most preferably pure vinyl chloride.

The initiators used in the practice of the present invention can consist of organic or inorganic peroxides, persulfates, ozonides, hydroperoxides peracids, percarbonates, azo compounds, diazonium salts, diazotates, peroxysulfonates and amine oxides; the preferred initiators are the water soluble compounds such as ammonium persulfate potassium persulfate and hydrogen peroxide.

The amount of initiator utilized in the practice of this invention is determined by the monomer to be polymerized and the speed of polymerization desired and is well within the knowledge of one skilled in the art. However, initiator concentrations of from about 0.2 percent to about 3 percent by weight of the monomer are usually employed.

As used herein, dispersion polymerization describes a polymerization conducted with a monomer dispersed in a medium which is a non-solvent for both the monomer and the polymer. In commercial practice the dispersing medium is usually water.

The dispersion polymerization can be conducted at from about 0° to about 120° C. for varying periods of time depending on the type of monomers utilized and the polymerization technique employed. The choice of a specific reaction temperature is dependent to a large extent on the initiator which is utilized and the rate of polymerization desired. Preferably the polymerization is conducted at temperatures of from about 20° C. to about 70° C.

The polymerization can be conducted in equipment suitable for dispersion polymerization. The pressure of the polymerization is determined by the monomer being polymerized and the temperature of the polymerization. Any polymer additives ordinarily incorporated during polymerization can be added in the practice of this invention.

The process of this invention produces a polymer which is easily washed, dried and handled. The particle size is generally larger than 1$\mu$.

The following example is included to better illustrate the present invention.

EXAMPLE 1

A polymerization pressure vessel was charged with 379 grams of deionized water, 0.60 gram of $(NH_4)_2S_2O_8$ (ammonium persulfate) initiator, 2.0 grams of tetradecylamino bis-methylene sodium sulfonate and 200 grams of vinyl chloride. The reactor was agitated at 20 r.p.m. at 45° C. for 24 hours. At the end of this period, the reactor was vented and the polyvinyl chloride polymer was separated from the liquid and washed. The dried product was a granular material with a particle size of from about 20$\mu$ to about 200$\mu$ and represented a conversion of 80 percent.

What is claimed:

1. A process for the preparation of polymers comprising polymerizing by emulsion techniques in the presence of a water soluble initiator a vinyl halide monomer at a temperature of from about 20° C. to about 70° C.

wherein from about 0.5% to about 2.0% by weight based on monomer of an emulsifying agent selected from the group consisting of compounds of formula (I) 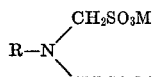

(II) 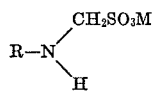

(III) 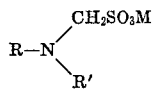

wherein M is a monovalent positive ion having a molecular weight from about 2 to about 40 and R and R' are alkyl groups containing from about 10 to about 30 carbon atoms is employed.

2. The process of claim 1 wherein the emulsifying agent is (I) 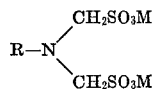

wherein R is an alkyl group containing from 10 to 30 carbon atoms.

3. The process of claim 2 wherein M is sodium.

4. The process of claim 1 wherein the monomer is a vinyl chloride monomer.

5. The process of claim 1 wherein the initiator is selected from the group consisting of ammonium persulfate sodium persulfate, potassium persulfate and hydrogen peroxide.

6. The process of claim 1 wherein the vinyl halide monomer is vinyl chloride, the emulsifier is tetradecylamino bis-methylene sodium sulfonate and the water soluble initiator is ammonium persulfate, said initiator being employed in an amount of from about 0.2% to about 3% by weight of the monomer employed.

References Cited

UNITED STATES PATENTS

| | | | |
|---|---|---|---|
| 2,373,870 | 4/1945 | Coffman et al. | 260—513N |
| 2,721,875 | 10/1955 | Dickert et al. | 260—513N |
| 2,520,957 | 9/1950 | Powers | 260—92.8W |
| 2,758,133 | 8/1956 | Erickson | 260—513N |

OTHER REFERENCES

Emulsion Polymerization, in Encyclopedia of Polymer Science and Technology, vol. 5, p. 817.

JOSEPH L. SCHOFER, Primary Examiner

J. A. DONAHUE JR., Assistant Examiner

U.S. Cl. X.R.

260—80.6, 85.5, 85.7, 86.1, 87.1, 87.5, 87.7, 88.1, 88.2, 88.5, 88.7, 89.1, 89.3, 89.5, 89.7, 91.1, 91.5, 91.7, 92.1, 92.3, 93.5, 93.7, 94.9